(12) United States Patent
Coloma et al.

(10) Patent No.: US 8,497,816 B2
(45) Date of Patent: Jul. 30, 2013

(54) CROSSED MONITORING DEVICE FOR HEAD-UP DISPLAYS

(75) Inventors: Laurent Coloma, Toulouse (FR); David Bideau, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 541 days.

(21) Appl. No.: 12/682,046

(22) PCT Filed: Sep. 26, 2008

(86) PCT No.: PCT/FR2008/051735
§ 371 (c)(1),
(2), (4) Date: Apr. 8, 2010

(87) PCT Pub. No.: WO2009/050393
PCT Pub. Date: Apr. 23, 2009

(65) Prior Publication Data
US 2010/0207843 A1    Aug. 19, 2010

(30) Foreign Application Priority Data

Oct. 12, 2007  (FR) ...................................... 07 58286

(51) Int. Cl.
*G09G 5/00* (2006.01)
(52) U.S. Cl.
USPC ................................................ 345/1.1; 345/8
(58) Field of Classification Search
USPC ....................................................... 345/1.1, 8
See application file for complete search history.

(56) References Cited

U.S. PATENT DOCUMENTS

| 3,557,470 | A | | 1/1971 | Emerick et al. |
|---|---|---|---|---|
| 5,808,563 | A | | 9/1998 | Ching et al. |
| 6,154,151 | A | * | 11/2000 | McElreath et al. ........... 340/970 |
| 2005/0149364 | A1 | * | 7/2005 | Ombrellaro ....................... 705/3 |
| 2006/0066459 | A1 | | 3/2006 | Burch et al. |
| 2006/0164260 | A1 | | 7/2006 | Berthou et al. |
| 2007/0198141 | A1 | | 8/2007 | Moore |
| 2007/0218428 | A1 | * | 9/2007 | Taffet ............................. 434/41 |
| 2008/0246633 | A1 | | 10/2008 | Pouzolz |

FOREIGN PATENT DOCUMENTS

| FR | 2 892 092 | 4/2007 |
|---|---|---|
| WO | 2004 037643 | 5/2004 |

* cited by examiner

*Primary Examiner* — Amr Awad
*Assistant Examiner* — Randal Willis
(74) *Attorney, Agent, or Firm* — Oblon, Spivak, McClelland, Maier & Neustadt, L.L.P.

(57) ABSTRACT

A crossed monitoring device for a head-up display that can be used for displaying a representation of at least one first datum. The device includes a mechanism generating at least one first image from the at least one first datum, a mechanism receiving from the at least one second display at least one second image generated from at least one second datum, and a mechanism selecting one of the first and at least one second image. The device can further include a mechanism modifying images according to characteristics of the displays. Each display can modify the images to be displayed according to its characteristics, and each display can modify the images according to the characteristics of each display.

14 Claims, 5 Drawing Sheets

CROSSED MONITORING DEVICE FOR HEAD-UP DISPLAYS

BACKGROUND OF THE INVENTION

1. Field of the Invention

The present invention relates to the display of information items on display devices known as head-up, and more particularly to a crossed monitoring device for display units of this type, making it possible, especially for a pilot in an aircraft, to view, via his display unit, the information items presented on the display unit of the pilot seated beside him.

Aircraft cockpits are generally not equipped with display devices known as head-up, also called HUD (initials for Head-Up Display in English terminology), but are equipped with conventional CRT or flat screens installed in the instrument panels. These conventional screens generally have viewing angles sufficiently broad to permit a pilot seated in the left position to have visual access to all of the information items displayed on the screens at the right and vice versa.

Consequently, in a traditional cockpit, it is possible for a pilot to access the entirety of the information items presented on the different screens. In particular, it is basic on the primary piloting screen, known as PFD (initials for Primary Flight Display in English terminology), where the pilots often have a need to verify the validity of their primary flight parameters, such as attitude and speed. In fact, parameters originating from a first set of sensors are presented on the screens at the left and parameters originating from a second set of sensors are presented on the screens at the right. This segregation permits a pilot to monitor his own parameters in independent manner.

On a head-up display device, the problem is different, inasmuch as the information items projected onto the HUD screen can be observed only in a limited volume of space known as the eye box (eyebox in English terminology). This eyebox, which has limited dimensions, is centered around the eye of the pilot. In certain aircraft, such as military airplanes, it permits the use of night-vision goggles.

Figure 1:
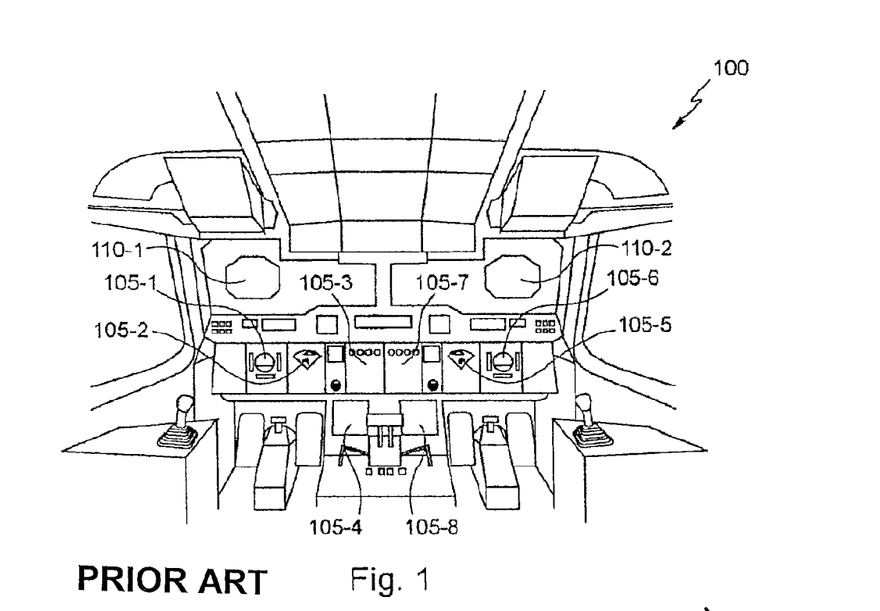
FIG. 1 represents an aircraft cockpit comprising eight head-down screens and two screens known as head-up.

FIG. 1 shows an aircraft cockpit 100 comprising eight head-down screens, referenced 105-1 to 105-8, and two head-up screens, referenced 110-1 and 110-2. Thus the pilot on the left is able to view information items displayed on the screens in front of him, or in other words here on screens 105-1 to 105-4 and 110-1, as well as on the head-down screens situated in front of the pilot situated on the right, or in other words here on screens 105-5 to 105-8. Similarly, the pilot on the right is able to view information items displayed on screens 105-5 to 105-8 and 110-2, as well as on head-down screens 105-1 to 105-4.

Figure 2:
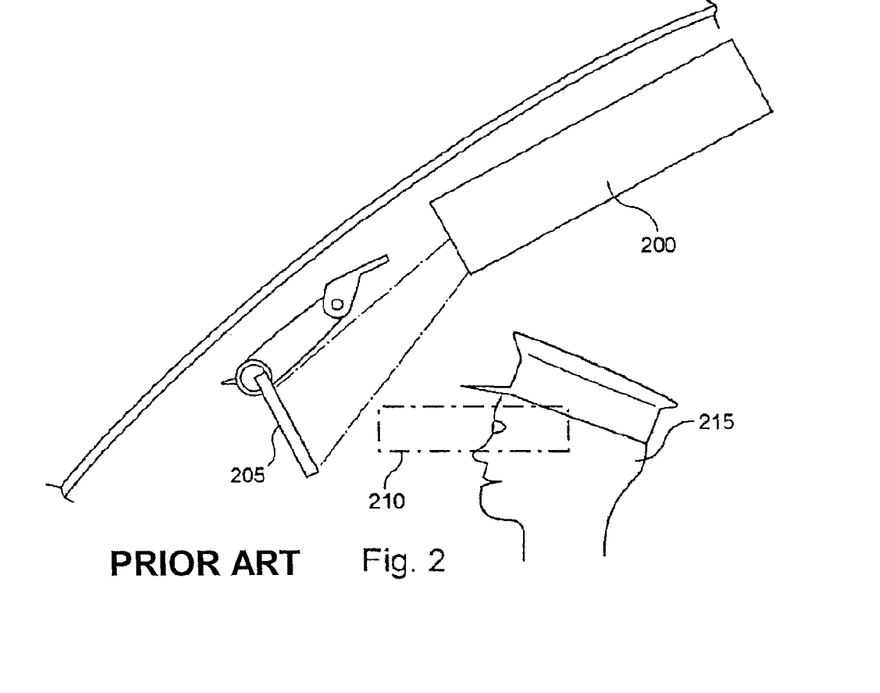
FIG. 2 illustrates the principle of a head-up screen.

FIG. 2 illustrates the principle of a head-up screen comprising a projector 200 and an at least partly transparent screen 205, on which there are projected the information items to be displayed. Reference 210 schematizes an eyebox in which the eyes of a user 215 must be situated if the user is to be able to view the information items projected by projector 200 onto screen 205.

Considering the state of the parameters available on the communication buses to which the head-up display system is connected as basis, and taking the manual selections of the pilot into account, a computer known as HUDC (initials for Head-Up Display Computer in English terminology) generates a digital video image which is then transmitted to the projector, known as HPU (initials for Head-Up Projection Unit in English terminology), for display. The projected digital video image is usually generated on the basis of data originating from sensors and of graphical symbols, forming a symbology represented by the digital video image.

Viewed from the side, as illustrated in FIG. 2, an eyebox has a length of approximately 10 cm. Thus it is not possible for a pilot to have direct access to the information items presented in the HUD of his neighbor.

This problem is crucial for aircraft in which the HUDs are being used as the primary piloting instrument, or in other words for aircraft in which the pilots have the option of not displaying the PFD on the head-down screens.

As described in the foregoing, each HUD constructs its image on the basis of a selection of data. In practice, certain information items pertaining to a first set of sensors can be selected to be displayed on a first HUD. Similarly, certain information items pertaining to a second set of sensors can be selected to be displayed on a second HUD. Consequently, each HUD has its own source-selection function, which depends on the side on which the HUD is installed.

2. Description of the Related Art

Figure 3:
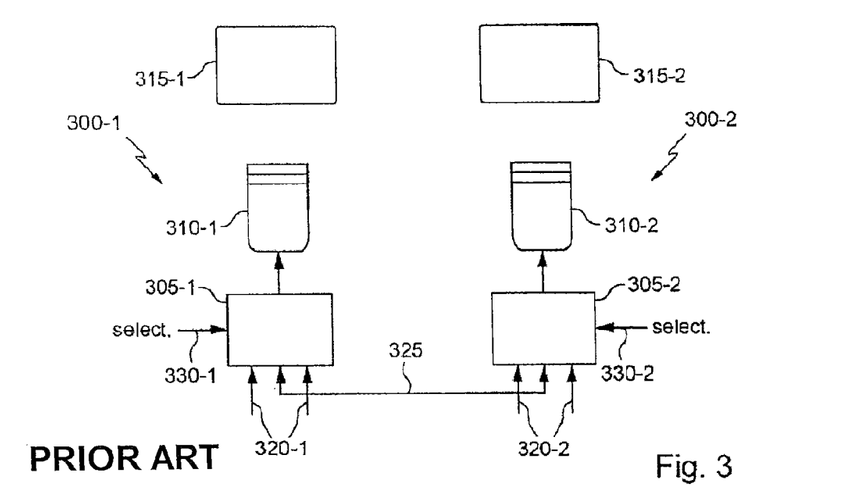
FIG. 3 illustrates a known solution for crossed monitoring when two HUDs are used.

According to a known solution, shown in FIG. 3, a crossed communication bus is established between the different HUDs, to permit them to exchange selected information items pertaining to the different sets of sensors.

Upon a command of the pilot, via a button dedicated to crossed monitoring and accessible on a control panel, the HUD uses the selected information items originating from sensors associated with another HUD to generate an image based on the same information items as those displayed on another HUD.

FIG. 3 illustrates this solution when two HUDs are used. The first HUD, referenced 300-1, comprises a computer 305-1, a projector 310-1 and a projection screen 315-1.

Via communication bus 320-1, computer 305-1 receives information items from a sensor group divided into two corresponding subgroups, such as a right subgroup and a left subgroup. Some of those information items are selected by the pilot so as to be displayed. The selected information items are used to form an image, which is transmitted to projector 310-1 to be projected onto screen 315-1.

Similarly, the second HUD, referenced 300-2, comprises a computer 305-2, a projector 310-2 and a projection screen 315-2. The selected information items, originating from communication bus 320-2, are used to form an image, transmitted to projector 310-2 and projected onto screen 315-2.

A communication bus 325 connects computers 305-1 and 305-2 in such a way that the data selected in computer 305-1 are transmitted to computer 305-2 and, reciprocally, the data selected in computer 305-2 are transmitted to computer 305-1.

Computers 305-1 and 305-2 additionally comprise commands 330-1 and 330-2 respectively, which make it possible to determine which selected information items must be displayed. According to a common mode of operation, the selected information items originating from the set of sensors associated with the HUD under consideration are displayed, while in a crossed mode of monitoring the selected information items originating from the set of sensors associated with the other HUD are displayed.

According to this method, it is therefore necessary to manage the selection of data sources, to manage a communication bus between the computers being used and to acquire the data originating from several sets of sensors.

Although this solution permits crossed monitoring of information items displayed in the HUDs, it has several drawbacks, especially in terms of segregation of data and in terms of reliability.

BRIEF SUMMARY OF THE INVENTION

The invention makes it possible to solve at least one of the problems described in the foregoing.

An object of the invention is therefore a crossed monitoring device for a head-up display unit, permitting viewing of a representation of at least one first datum, this device comprising the following means, means for generating at least one image, referred to as first image, on the basis of the said at least one first datum;

means for receiving, from at least one second display unit, at least one image, referred to as at least one second image, generated on the basis of at least one second datum; and means for selecting one of the said first images and at least one second image.

In this way the invention makes it possible to achieve crossed monitoring using the HUD, in other words permitting the pilot to access information items displayed on a second HUD, directly and without moving around, in a reliable manner and without adversely affecting the segregation of the data.

Advantageously, the device additionally comprises means for modifying the said first image according to the characteristics of the said first display unit to take into account the distortion caused by the display of the said first image by the said first display unit.

Preferably the device additionally comprises means for transmitting the said first image to the said at least one second display unit to permit the said second display unit to display the said first image.

According to a particular embodiment, the device additionally comprises means for modifying the said first image according to the characteristics of the said at least one second display unit to take into account the distortion caused by the display of the said first image by the said at least one second display unit.

Advantageously the device additionally comprises means for receiving the said characteristics of the said at least one second display unit, making it possible to determine the modifications to be made to the said first image to take into account the distortion caused by the display of the said first image by the said at least one second display unit.

According to yet another particular embodiment, the device additionally comprises means for modifying the said at least one second image according to the characteristics of the said first display unit in order to take into account the distortion caused by the display of the said second image by the said first display unit.

Advantageously, the device additionally comprises the following means, means for receiving at least one image, referred to as third image, from an external source; and means for combining the said first and third images.

In this way, the device according to the invention makes it possible to add, to the third image originating for example, from a device of EVS or SVS type, certain information items contained in the first image concerning, for example, flight parameters.

According to yet another particular embodiment, the device additionally comprises means for receiving an independent external synchronization signal, used to display images.

Preferably the device additionally comprises means for inserting, in the said at least one second image, an indication according to which the said at least one second image originates from the said at least one second display unit, in order to provide an indication concerning the source of the information items being viewed.

Another object of the invention is an aircraft comprising the device such as described in the foregoing.

BRIEF DESCRIPTION OF THE DRAWINGS

Other advantages, objectives and characteristics of the present invention will become clear from the detailed description hereinafter, provided by way of non-limitative example, with regard to the attached drawings, wherein:

FIG. 8, comprising FIGS. 8a and 8b, illustrates the use of the crossed monitoring function.

DETAILED DESCRIPTION OF THE INVENTION

The general principle of the invention consists, for a computer of a first HUD, in acquiring an image generated by a computer of a second HUD to be displayed by the projector of this second HUD and, following an activation command from the pilot, in displaying it on the projector of the first HUD, in other words the HUD associated with the command to activate crossed monitoring.

According to a first embodiment, one or more images is or are created by each computer, by duplicating the image generated thereby, in such a way that an image is transmitted to each projector. Selection of the image to be displayed is effected at the projector, which receives several images, according to a selection command, for example by means of a specific crossed monitoring button, which may be located on the control panel. The selection command acts as a video source selector.

In other words, in an aircraft comprising two HUDs, the solution consists in this case in recovering the image generated by the opposite computer so as to display it, upon a command from the pilot, on the HUD from which the request for crossed monitoring was sent.

Because of the distortion caused by the projection of images, a distortion correction function is advantageously applied, at the computer, to the created images. In particular, as illustrated in FIG. 2, since the axis of projector 200 is not perpendicular to projection screen 205, there results a deformation of the projected image. However, by reason of the specificities of each projector/screen assembly, the distortion correction functions applied to the created images are different from one another and are different as a function of the distortion correction applied to the generated image.

Figure 4:
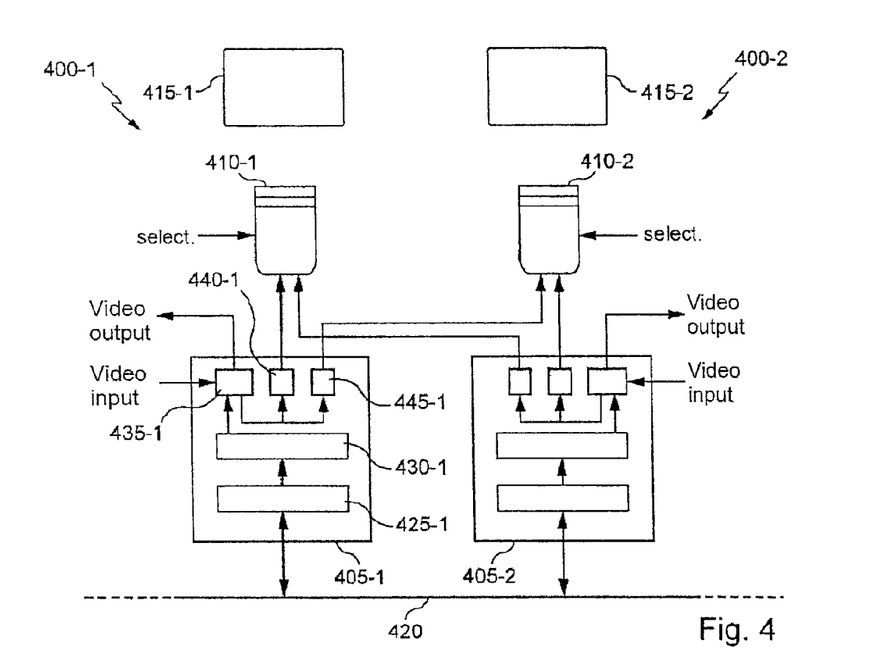
FIG. 4 illustrates an example of employment of the invention according to a first embodiment when two HUDs are used.

FIG. 4 illustrates an example of employment of the invention according to this first embodiment when two HUDs are used. As in the example illustrated in FIG. 3, the HUDs, referenced 400-1 and 400-2, each comprise, respectively, a computer 405-1 and 405-2, a projector 410-1 and 410-2 and a projection screen 415-1 and 415-2.

A data bus 420 permits computers 405-1 and 405-2 to access the data originating from each set of sensors.

Computer 405-1 comprises an input/output module 425-1, making it possible in particular to access the data transported by bus 420. The data selected and accessed by input/output module 425-1 are transmitted to a processing module 430-1. The processing makes it possible to transform the data accessed in the form of images, preferably two-level images. By way of illustration, one level may represent the transparent zones, where nothing is displayed, while a second level is related to the representation of the data. However, the nature of the processing, related in particular to the nature of the data to be displayed, is outside the scope of the invention and will not be discussed here. The images created by module 430-1 are transmitted in the form of a video stream to mixing module 435-1, where they can be integrated into a video stream originating from an external source. The external source is, for example, an infrared sensor of EVS type (initials for Enhanced Vision System in English terminology).

Module 435-1 generates a video stream, if necessary by adding the images created in module 430-1 pixel-by pixel (acronym for picture element in English terminology) to the images of the video stream originating from an external source. If the video stream originating from an external source does not have to be taken into account, the generated video stream corresponds to the video stream created by module 430-1. This generated video stream is transmitted to modules 440-1 and 445-1 for calculation of the distortion correction. The generated video stream may also be routed to an output of computer 405-1 to be displayed, for example, on a head-down screen.

Modules 440-1 and 445-1 for calculation of the distortion correction transform the video stream originating from mixing module 435-1 to adapt it to projectors 410-1 and 410-2 respectively. Here it is necessary to use as many modules for calculation of the distortion correction as there are projectors to which the video stream is transmitted.

When the video stream has been adapted to each of the projector/screen assemblies, it is transmitted to each projector. Here the video stream originating from module 440-1 is transmitted to projector 410-1, while the video stream originating from module 445-1 is transmitted to projector 410-2.

Here computers 405-1 and 405-2 are similar and comprise the same modules.

Projector 410-1 receives a first video stream originating from computer 405-1 and a second video stream originating from computer 405-2. The projected video stream is defined by the state of a selection command.

Figure 7:
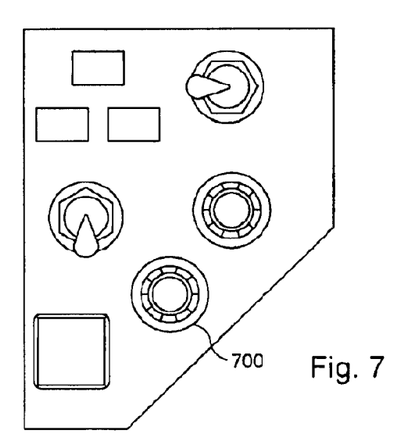
FIG. 7 represents an example of positioning, on a control panel, of a button for activating the crossed monitoring mode.

Since the crossed monitoring mode is preferably used only temporarily (in principle, it is used by the pilot only in case of doubt about the validity of the value of a presented parameter), it is not acceptable, a priori, to activate it continuously (the information items of a single set of sensors would be displayed on both sides of the cockpit). The selection commands therefore advantageously originate from a monostable control that can be activated only by pressing, or in other words from a monostable button that must be held down in order to access the crossed monitoring function. This control button is, for example, situated on a control panel as illustrated in FIG. 7.

Similarly, projector 410-2 receives a first video stream originating from computer 405-1 and a second video stream originating from computer 405-2. The projected video stream is defined by the state of a selection command different from that associated with projector 410-1.

The information items displayed when the crossed monitoring command is activated are identical to those displayed by the opposite HUD (if this is in normal mode). However, according to this first embodiment, it is necessary for each computer to create at least one second image and to employ two separate calculations of distortion correction, by taking into account the distortions induced by the projectors in question (it may be necessary to connect each projector to each computer to identify the distortions). It is also necessary to provide at least two video inputs per projector, as well as a video selection command.

A second embodiment consists in generating, at the level of the computer, a video stream identical to the video stream dedicated to the projector associated with the computer, before the distortion correction is calculated, and in sending it to the opposite computer in digital format via an optical fiber. This video stream is acquired by the opposite computer as an external video input, in the same way as a video stream originating, for example, from an infrared sensor of EVS type. The distortion corrections are therefore made locally by each computer for the associated projector.

Figure 5:
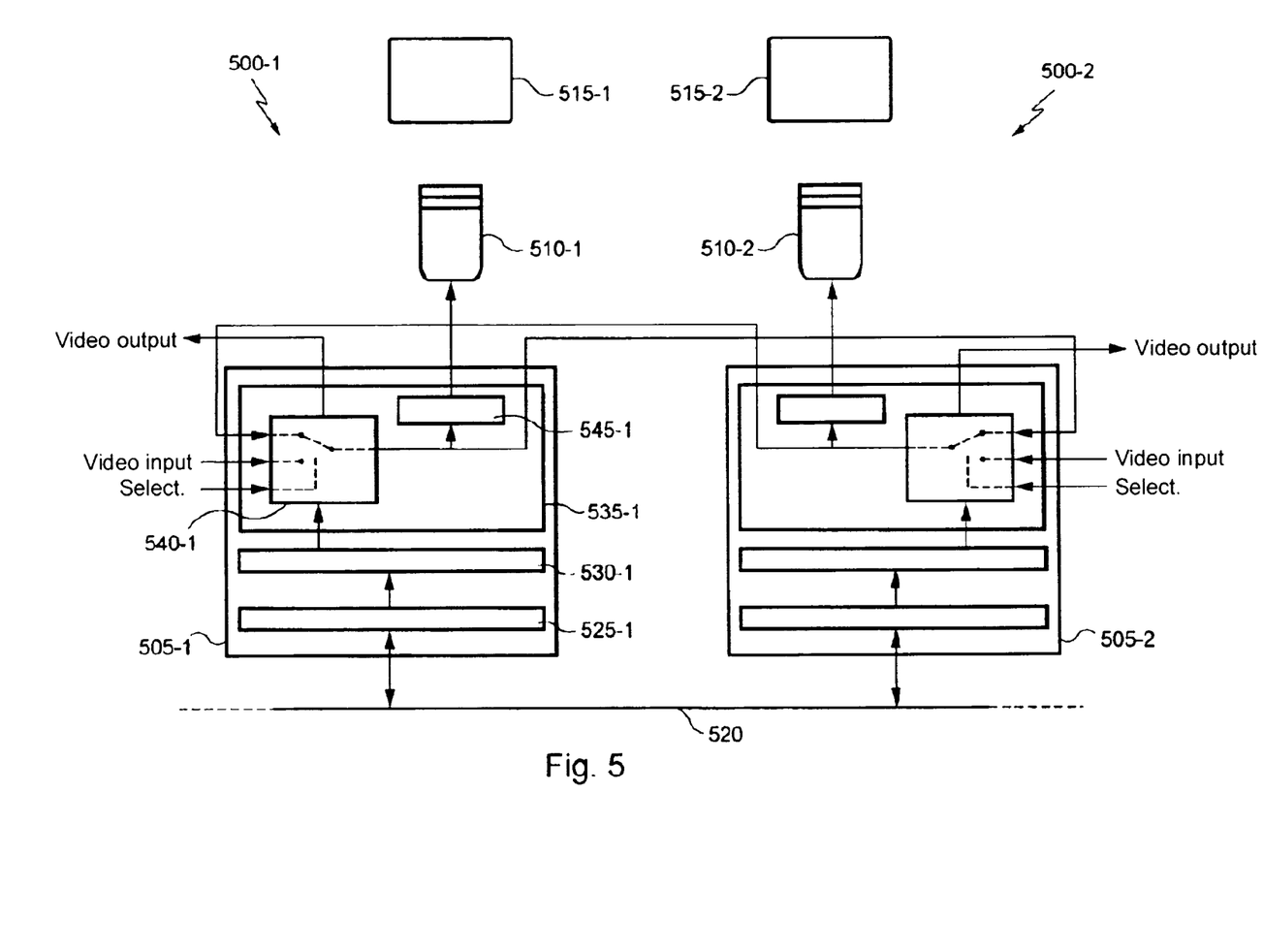
FIG. 5 illustrates an example of employment of the invention according to a second embodiment when two HUDs are used.

FIG. 5 illustrates an example of employment of the invention according to this second embodiment when two HUDs are used. As in the example illustrated in FIGS. 3 and 4, the HUDs, referenced 500-1 and 500-2, each comprise, respectively, a computer 505-1 and 505-2, a projector 510-1 and 510-2 and a projection screen 515-1 and 515-2.

A data bus 520 permits computers 505-1 and 505-2 to access the data originating from each set of sensors.

Computer 505-1 comprises an input/output module 525-1, making it possible in particular to access the data transported by bus 520. The data selected and accessed by input/output module 525-1 are transmitted to a processing module 530-1, where they are transformed in the form of images. As indicated in the foregoing, the nature of the processing is related to the nature of the data to be displayed and will not be discussed here.

The images originating from module 530-1 are transmitted to a video processing module 535-1, and more particularly to a control and mixing module 540-1, where they can be integrated into a video stream originating from an external source, such as an infrared sensor of EVS type, or into a video stream generated by another HUD. Module 540-1 produces a video stream comprising the images originating from processing module 530-1 and possibly the images of the video stream originating from another source.

The selection of the external source, in other words the selection of the video stream originating from an infrared sensor or the selection of a video stream originating from another HUD, is determined by the state of a selection command, which constitutes an input of module 540-1.

As indicated in the foregoing, the crossed monitoring mode is to be used only temporarily (in case of doubt about the validity or the value of a presented parameter). The selection command therefore advantageously originates from a monostable control that can be activated only by pressing, or in other words from a monostable button that must be held down in order to access the crossed monitoring function.

The video stream originating from module 540-1 is transmitted to module 545-1 for calculation of the distortion correction as well as to computer 505-2. The video stream generated in module 540-1 and comprising images originating from processing module 530-1 may also be routed to an output of computer 505-1 to be displayed, for example, on a head-down screen.

Module 545-1 for calculation of the distortion correction transforms the video stream originating from mixing and control module 540-1 to adapt it to the characteristics of the combination formed by projector 510-1 and screen 515-1.

When the video stream has been adapted to these characteristics, it is transmitted to projector 510-1.

Here computers 505-1 and 505-2 are similar and comprise the same modules.

In this way, in an aircraft comprising two HUDs, the information items displayed by one HUD when the crossed monitoring command is activated are identical to those displayed by the opposite HUD (if this is in normal mode).

According to this second embodiment, it is not necessary to modify the projectors or to integrate several modules for calculating the distortion correction in each computer. However, it is necessary, for each computer, to generate at least one second video stream not modified by a calculation of the distortion correction, to accept, at the input, at least one video stream originating from another HUD, and to manage the selection of a video stream among at least two video streams.

Figure 6:
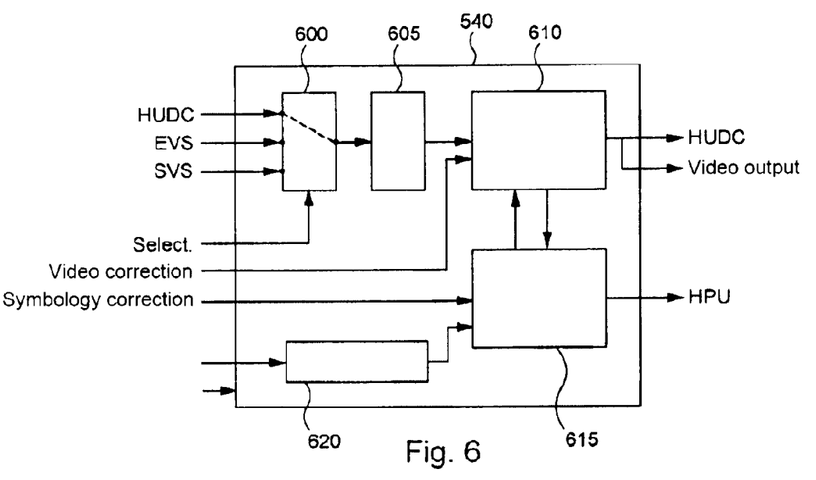
FIG. 6 illustrates a detailed view of a mixing and control module such as shown in FIG. 5.

FIG. 6 represents a detailed view of a mixing and control module such as module 540-1 of FIG. 5, generically referenced 540.

As illustrated, module 540 here comprises three video inputs, HUDC, EVS and SVS. The HUDC video input makes it possible to acquire the images generated by the computer of another HUD. Module 540 may comprise several HUDC inputs. The EVS video input makes it possible to acquire, if necessary, a video stream originating from a system of EVS type. The SVS video input makes it possible to acquire, if necessary, a video stream of SVS type (initials for Synthetic Vision System in English terminology), in other words a stream of synthetic images or a stream of augmented reality images. The information items selected to be displayed and forming a sequence of images can be added to any one of these three video streams.

The HUDC, EVS and SVS video inputs are connected to a switch 600 controlled by a selection command. The output of switch 600 corresponds to the selected video stream.

The video stream originating from switch 600 is transmitted to a video module 605, which makes it possible, as the case may be, to modify certain parameters of the video stream such as the image resolution, for example. The video stream originating from video module 605, referred to as image background video stream, is transmitted to a first mixing and correction module, referenced 610.

Simultaneously, a module 620 for graphical generation of the symbology generates a video stream containing the information items to be displayed. The information items contained in this video stream are those that have been selected by the pilot. The video stream originating from module 620, referred to as symbology video stream, is transmitted to a second module, referenced 615, for mixing and correction.

In addition to the image background video stream originating from module 605, module 610 also receives parameters for correction of the image background video stream and the symbology video stream. As suggested by FIG. 6, the symbology video stream received by module 610 passes through module 615. The parameters for correction of the image background video stream are adapted to modify the image background video stream according to the characteristics of the HUD to which module 540 belongs.

On the basis of the image background video stream and of the symbology video stream, module 610 generates an uncorrected video stream which is transmitted to other computers (HUDC) and possibly to other devices such as a head-down screen (video output). The uncorrected video stream is obtained by a linear combination, pixel-by-pixel, of the image background and symbology video streams. The linear combination coefficients make it possible in particular to adjust the contribution of each of the video streams to favor understanding of the information items contained in the resultant video stream.

In parallel, module 610 modifies the image background video stream received from module 605 according to the received parameters for correction of the image background video stream. This modified image background video stream is transmitted to second module 615 for mixing and correction.

In addition to the modified image background video stream received from module 610 and the symbology video stream received from module 620, module 615 also receives parameters for video correction of the symbology video stream adapted to modify the symbology video stream according to the characteristics of the HUD to which module 540 belongs. Module 615 modifies the symbology video stream according to these parameters to form a modified symbology video stream, which is combined linearly, pixel-by-pixel, with the modified image background video stream to form a modified video stream which is transmitted to the HPU associated with module 540 to be displayed.

The parameters for correction of the image background and symbology video streams as well as the information items necessary for generation of the symbology video stream are received from a processing module of the computer to which module 540 belongs.

In this way, in an aircraft comprising two HUDs, the images arriving from the opposite HUDC are acquired in the video stream form, as an external video stream. This video stream then may or may not be mixed with the images containing the locally generated selected information items.

According to a particular embodiment, when the pilot activates the crossed monitoring function, the images received from another computer are corrected to compensate for the distortion, then mixed with an empty set of information items to be displayed, or in other words with an empty symbology, in order to obtain only the display of the symbology originating from another computer. This resultant image is then transmitted by optical fiber to the projector. In this way, several symbologies are not displayed simultaneously.

To achieve crossed monitoring, it is necessary to provide the pilot with a means of activating this function temporarily. As indicated in the foregoing, it is used by the pilot only in case of doubt about the validity or value of a displayed parameter. It should not be able to be activated continuously. The crossed monitoring command may therefore be activated by the aid of a monostable control that can be activated only by pressing, in other words it is necessary to hold it down in order to access the function. According to a particular embodiment, this control button is situated on the control panel situated at the end of the glare shield of each HUD, as illustrated in FIG. 7, where reference 700 denotes the control button.

When the crossed monitoring function is activated, the data pertaining to a single set of sensors are displayed on both sides of the cockpit. A corresponding indication is then advantageously presented on the HUDs to alert the pilots of the situation.

Consequently, when the pilot situated on the left activates the crossed monitoring function, a message of the type "BOTH ON RIGHT" is superposed on the video stream and displayed on both HUDs in order to forewarn the pilots that they are both looking at information items originating from the computer on the right. In the same way, when the pilot situated on the right activates the crossed monitoring function, a message of the type "BOTH ON LEFT" is superposed on the video stream and displayed on both HUDs.

Furthermore, it should be noted that problems of synchronization of the video streams may occur. In fact, in order that an external video stream can be displayed, it must be synchronized on an external and independent synchronization input. In this way, if a first HUD is synchronized on a video stream originating from a second HUD, and vice versa, synchronization may be impossible to achieve when the crossed monitoring function is activated. To resolve this problem, it is possible to use an external, common and independent source, such as the EVS video stream.

To alleviate the potential problem of synchronization and of associated time lag, a particular indication is preferably added. When the pilot activates the crossed monitoring function, the video stream originating from another computer is displayed if it is immediately available. If, after a first predetermined delay, for example a delay of 200 ms, the image is not available, a message of the type "PLEASE WAIT" is advantageously displayed on the HUD in question in order to provide an action report to the pilot. If, after a second predetermined delay, for example a delay of 3 s, the image is still not available, then a message of the type "X-CHECK NOT AVAILABLE" is displayed on the HUD in question.

Figure 8:
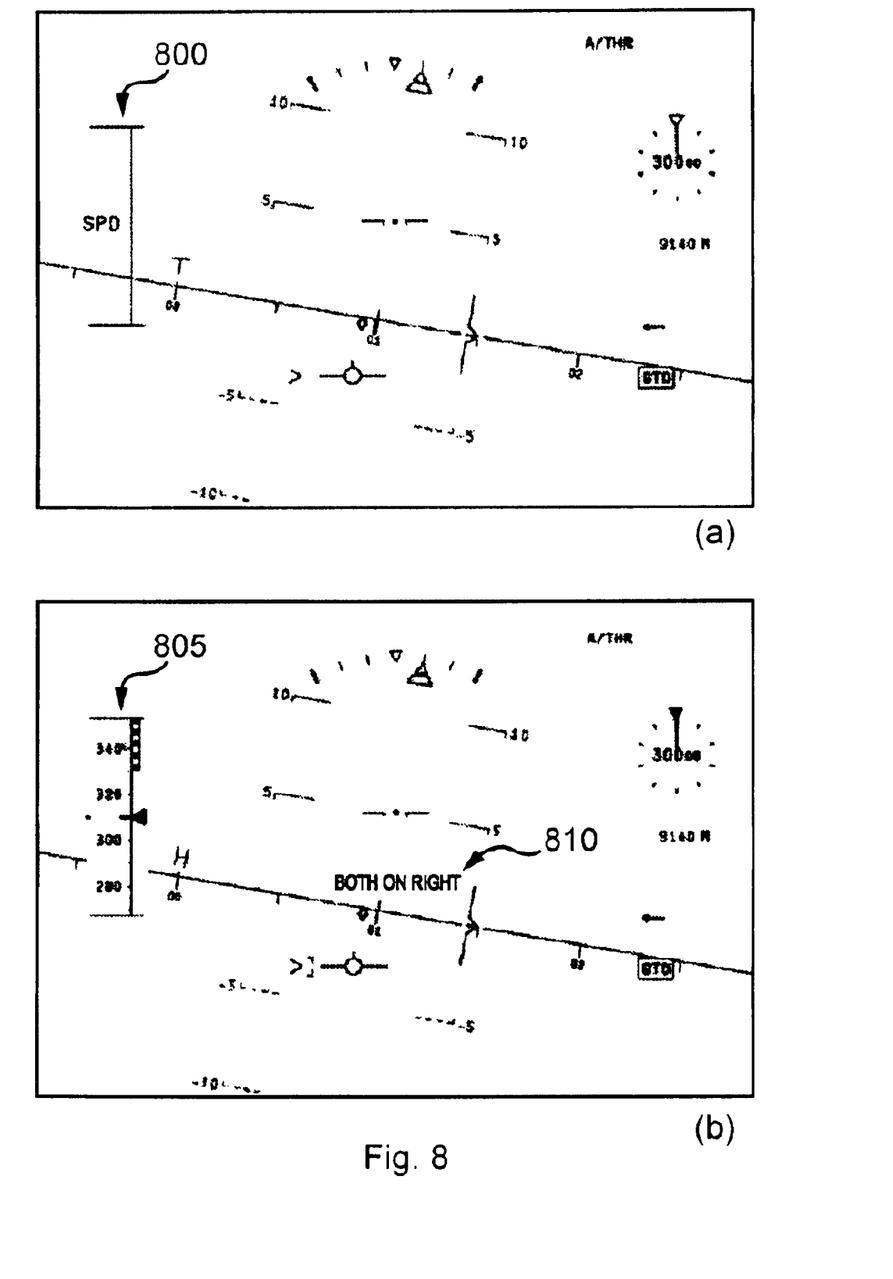

FIG. 8, which comprises FIGS. 8a and 8b, illustrates an example of use of the crossed monitoring function. FIG. 8a represents the display of the HUD of a first pilot in normal mode, while FIG. 8b represents the display of the HUD of the same pilot when the crossed monitoring function is activated.

As illustrated in FIG. 8a by reference 800, the information items pertaining to speed indicate a problem of validity thereof.

To check the speed displayed on the opposite HUD, the first pilot activates the crossed monitoring function by pressing the control button dedicated to this use.

As illustrated in FIG. 8b, particularly with reference 805, the symbology originating from the opposite side is displayed on the HUD of the first pilot, together with the message "BOTH ON RIGHT" (reference 810).

When the first pilot releases the control button for activation of crossed monitoring, his HUD resumes displaying the information items presented in FIG. 8a.

Naturally, to satisfy specific needs, a person skilled in the art of the invention will be able to apply modifications to the foregoing description.

The invention claimed is:

1. A crossed monitoring device for a display system of an aircraft comprising:
   means for activating the crossed monitoring; and
   means for accessing data; and
   a first head-up display unit; and
   a second head-up display unit;
   each head-up display unit including:
      means for processing data to generate a first image;
      means for calculating a first image distortion correction for the generated first image, associated with a projection format;
      means for calculating a second image distortion correction for the generated first image, associated with a second projection format;
      means for projecting the first corrected image; and
      means for outputting the second corrected image to the other head-up display unit,
   wherein activating the cross-monitoring function allows the second corrected image generated by one of the head-up display units to be projected onto the other head-up display unit.

2. A device according to claim 1, further comprising means for receiving an independent external synchronization signal.

3. A device according to claim 1, further comprising means for inserting, in an image, an indication that the image originates from the second head-up display unit.

4. An aircraft comprising the device according to claim 1.

5. The device according to claim 1, wherein the first image generated by the first head-up display unit can be integrated with images from the second head-up display unit, and the first image generated by the second head-up display unit can be integrated with images from the first head-up display unit.

6. The device according to claim 1, wherein the first image generated by one of the head-up display units can be integrated with images from at least one source other than the other head-up display unit.

7. The device according to claim 1, wherein the means for calculating an image distortion correction for each head-up display unit calculates the image distortion correction for its own projection format.

8. The device according to claim 1, wherein the means for calculating an image distortion correction for each head-up display unit calculates the image distortion corrections for the projection formats of both head-up display units.

9. The device according to claim 1, wherein each head-up display unit includes means for outputting an image to a head-down display.

10. The device according to claim 1, wherein each head-up display unit includes means for outputting an image to a different head-up display unit.

11. The device according to claim 1, wherein each head-up display unit includes means for integrating the first image with images from at least one other source.

12. A device according to claim 1, further comprising means for inserting, in the first image, a notification of time lags associated with defective synchronization between head-up display units.

13. A device according to claim 1, wherein the means for activating the cross-monitoring is a monostable control, permitting temporary activation of said crossed-monitoring.

14. An apparatus for cross-monitoring on a display system for an aircraft, said apparatus comprising:
   a monostable control which permits temporary activation of said crossed-monitoring;
   a first head-up display unit; and
   a second head-up display unit, wherein each head-up display unit includes:
      a processing module which transforms data into a first image;
      a distortion correction module which calculates a first distortion correction and a second distortion correction for the first image;
      an output port which outputs the second corrected image to the other head-up display unit;
      an input port which receives the second corrected image from the other head-up display unit;
      a projector which projects the first corrected image; and
      a screen which displays the first corrected image,
   wherein activating the cross-monitoring function allows the second corrected first image generated by one of the head-up display units to be projected onto the other head-up display unit.

* * * * *